(12) United States Patent
Shrivastava et al.

(10) Patent No.: US 12,075,294 B2
(45) Date of Patent: Aug. 27, 2024

(54) OPERATING USER EQUIPMENT IN 5G NR COMMUNICATIONS SYSTEM

(71) Applicant: SAMSUNG ELECTRONICS CO., LTD., Suwon-si (KR)

(72) Inventors: Vinay Kumar Shrivastava, Karnataka (IN); Avijit Manna, Karnataka (IN); Ankit Srivastav, Karnataka (IN); Ankit Dhabriya, Karnataka (IN); Sarvesha Anegundi Ganapathi, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 17/430,685

(22) PCT Filed: Feb. 14, 2020

(86) PCT No.: PCT/KR2020/002175
§ 371 (c)(1),
(2) Date: Aug. 12, 2021

(87) PCT Pub. No.: WO2020/167072
PCT Pub. Date: Aug. 20, 2020

(65) Prior Publication Data
US 2022/0201566 A1    Jun. 23, 2022

(30) Foreign Application Priority Data

Feb. 14, 2019  (IN) .............................. 201941005906
Feb. 13, 2020  (IN) .............................. 201941005906

(51) Int. Cl.
*H04W 36/00* (2009.01)
*H04L 1/00* (2006.01)
(Continued)

(52) U.S. Cl.
CPC ..... *H04W 36/00837* (2018.08); *H04L 1/0038* (2013.01); *H04W 36/0058* (2018.08); *H04W 56/001* (2013.01); *H04W 72/23* (2023.01)

(58) Field of Classification Search
CPC .............. H04L 1/0038; H04L 5/0053; H04W 36/00837; H04W 36/0058; H04W 56/001;
(Continued)

(56) References Cited

U.S. PATENT DOCUMENTS 9,949,164 B2    4/2018    Heo et al.
10,887,834 B2   1/2021    Ryoo et al.
(Continued)

FOREIGN PATENT DOCUMENTS

CN    110312261 B   *  2/2024  ............ H04W 16/14
EP    2245898          11/2010
(Continued)

OTHER PUBLICATIONS

Vivo, "UE power Consumption Reduction in RRM Measurements", R1-1812332, 3GPP TSG RAN WG1 Meeting #95, Spokane, US, Nov. 12-16, 2018, pp. 1-8. (Year: 2018).*
(Continued)

*Primary Examiner* — Rownak Islam
(74) *Attorney, Agent, or Firm* — F. Chau & Associates, LLC (57) ABSTRACT

The present disclosure describes methods of operating user equipment in 5G NR communications system. In accordance with some of the embodiments, the method comprises detecting a condition related to the user equipment (UE) while in one of a radio frequency (RF) inactive state and a cell handover, the condition indicating one of (a) the UE is not in reception of signaling information from a serving base station during the RF inactive state and (b) the UE is out of synchronization with the serving base station; determining
(Continued)

an event related to one of transmission of data by the UE, reception of data by the UE, and radio resource management (RRM) measurement by the UE in conjunction with the detected condition; and applying one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform radio resource management (RRM) measurement.

12 Claims, 3 Drawing Sheets

(51) Int. Cl.
*H04W 56/00* (2009.01)
*H04W 72/23* (2023.01)

(58) Field of Classification Search
CPC . H04W 72/23; H04W 48/12; H04W 52/0216; H04W 76/15; H04W 76/27; H04W 4/08; H04W 52/0245; H04W 76/28; H04W 88/02

USPC .......................................................... 370/331
See application file for complete search history.

(56) References Cited

U.S. PATENT DOCUMENTS

| | | |
|---|---|---|
| 2011/0319032 A1 | 12/2011 | Fica et al. |
| 2015/0250017 A1 | 9/2015 | Ingale et al. |
| 2016/0041626 A1 | 1/2016 | Yi et al. |
| 2019/0342898 A1* | 11/2019 | Nam ................ H04W 72/0446 |
| 2021/0274443 A1* | 9/2021 | Yang ....................... H04J 13/10 |

FOREIGN PATENT DOCUMENTS

| | | |
|---|---|---|
| WO | WO 2017-196146 | 11/2017 |
| WO | WO 2018-145019 | 8/2018 |

OTHER PUBLICATIONS

R1-1900913 UE Power Consumption Reduction in RRM Measurements, 3GPP TSG-RAN WG1 Meeting 1901 R1-1900913 Taipei, Taiwan, Jan. 21-25, 2019. pp. 1-14.
International Search Report Dated May 26, 2020 For Application Serial No. PCT/KR2020/002175).

* cited by examiner

OPERATING USER EQUIPMENT IN 5G NR COMMUNICATIONS SYSTEM

TECHNICAL FIELD

The present disclosure generally relates to 5th Generation (5G) New Radio (NR) communications systems and in particular, relates to operation of user equipment in the 5G NR communications system.

BACKGROUND ART

5th Generation New Radio (5G NR) is a completely new air interface being developed for 5G. An air interface is the radio frequency portion of the connection between a mobile device (or interchangeably referred to as user equipment, UE) and an active base station. The active base station can change as the user is on the move. 5G NR utilizes modulation, waveforms and access technologies to significantly improve the performance, flexibility, scalability, and efficiency of current mobile networks so as to deliver high data rate services with different latency and performance requirement while efficiently managing cost, power, & deployment requirements. 5G NR network measurements are conducted to measure the 5G NR network coverage accurately. 5G NR network measurements comprises mobility measurements like idle mode measurements to perform cell selection/reselection & handover and connected mode measurement to perform handover from one radio cell to another. As such, the UE measures & reports Reference Signal Received Power (RSRP), Received Signal Strength Indicator (RSSI), Reference Signal Received Quality (RSRQ) and Reference Signal-Signal-to-Noise and Interference Ratio (RS-SINR) on reference signal.

Further, 'always-on' cell specific reference signals are not present for 5G NR wireless communication system. As would be understood, the 'always-on' behavior refers to base stations always transmitting the Primary Synchronization Signal (PSS), Secondary Synchronization Signal (SSS), Cell-Specific Reference Symbols (C-RS), etc., for example in Long Term Evolution (LTE) wireless system. As such, in 5G NR, the UE measures Synchronization Signal Block Signal (SSB) and/or Channel State Information-Reference Symbols (CSI-RS) for mobility measurements. The SSB is a combination of SSS, PSS, Physical Broadcast Channel (PBCH), and PBCH Demodulation Reference Signals (PBCH-DMRS). The UE performs differential correlation and averaging for the Reference symbols and prepares measured results.

Now, the UE uses Discontinuous Reception (DRX) in order to reduce power consumption during NR network measurements. DRX cycle consists of "on periods" "during which the UE monitors downlink channels and physical signals (such as PDCCH) and "sleeping periods" when the UE can switch its receivers off. There are three Radio Resource Control (RRC) states defined for UE in 5G NR —RRC_IDLE, RRC_INACTIVE, and RRC_CONNECTED. DRX operation is controlled in the three RRC states by configuring various timers, i.e., DRX-ON DurationTimer, DRX Inactivity Timer, DRX Downlink Retransmission Timer, DRX Uplink Retransmission Timer, DRX LongCycle, and DRX ShortCycle.

The UE can perform CSI-RS measurement during inactive time of DRX when the DRX cycle is less than or equal to 80 milliseconds (ms) because sufficient/reliable measurements cannot be performed during active time of DRX when the DRX cycle is less than or equal to 80 ms. Also, it is possible that Measurement timing Configuration also called as SMTC does not match with the ON-duration and/or active time of the DRX cycle requiring the measurements to be performed in the inactive time of the DRX cycle. CSI-RS resources must be available during these occasions in the inactive time of DRX cycle to perform NR measurements. CSI-RS resources are possible on candidate set of symbols of the slots in the inactive time of DRX which are downlink. Slot format can be known from static configuration (optional parameters) and/or dynamic configurations. Dynamic slot format information is provided by slot format indication (SFI) signaling as present in Downlink Control Information (DCI) in DCI-Format 2.0 (DCI 2.0).

However, UE cannot perform CSI-RS measurements during inactive time of DRX in certain condition, i.e., (1) when static configurations are not available from the network, (2) SFI signaling is not detectable/receivable during inactive time of DRX, and (3) UE may not have slot format for the candidate set of symbol of the slots configured by higher layer for CSI-RS. In some conditions, periodicity for DCI 2.0 may not be aligned with the DRX cycle. For example, periodicity for DCI 2.0 can be cell specific configuration parameter whereas DRX configuration can be UE specific or a UE-group specific. Consequently, UE cannot perform CSI-RS measurement in inactive time of DRX due to the fact that the UE is not aware of the downlink symbols location of the configured slot for CSI-RS measurement.

Also, the above scenarios may affect measurement in active lime of the DRX cycle as well. As such, the UE may not able to do measurements in active time when: (1) static configurations are not available from the network, (2) SFI signaling is not detectable/receivable during inactive time of DRX, and (3) UE may not have slot format for the candidate set of symbol of the slots configured by higher layer for CSI-RS. In some conditions, periodicity for DCI 2.0 may not be aligned with the DRX cycle. The non-availability of any of static configurations, SFI signaling, and slot format also affects data reception in active time of the DRX cycle. As such, the UE may not be able to either receive data or confirm the received data as uplink data or downlink data.

Further, with advent of technology, the UE is able to support multiple or plurality of Subscriber Identity Modules (SIMs). The multiple SIMs can operate either in active mode or in standby mode at a time on more than one network. In a UE with Multi-SIMMulti-Active (MSMA) mode, for e.g., a UE with Dual-SIM-Dual-Active (DSDA) mode, all SIMs may be active at the same time. Such UE also contain multiple radios and supports multiple radio access technologies. Thus, the UE operating in MSMA mode may actively transmit or receive on different networks at same time. Also, all the SIMs have data connectivity or network service available and therefore can connect via network operator Packet Data Network (PDN), for e.g., Internet, Intranet, IP Multimedia Subsystem (IMS). In a UE with Multi-SIM-Multi-Standby (MSMS) mode, for e.g., a UE with Dual-SIM-Dual-Standby (DSDS), if any one SIM is active, then the rest of the SIM(s) are in a standby mode. Such UE contains single radio supporting multiple radio access technologies and is shared among the SIMs. Thus, the UE operating in MSMS mode may actively transmit or receive on one network at a time. Also, one SIM has data connectivity or network service available and can connect with via network operator PDN, while other SIMs'are in standby mode. The availability of the data connectivity or network service on any SIM from amongst the multiple SIMs is based on selection of the SIM. Such selection can be default settings in the UE or a user may select the SIM to provide the network services.

Typically, while operating in MSMS mode, the UE arbitrates or schedules common RF resource among multiple SIMs (and their associated protocol stacks), which result into periods of intermittent RF pauses (also termed as RF black-out or RF tuned away). As such, the UE is unable to transmit or receive data due to lack of RF resource on the SIMs in standby mode. Also, the UE is unable to transmit/receiving any signaling information due to lack of RF resource for the SIMs in standby mode.

Therefore, there is a need for a solution that can address the above mentioned deficiency.

DISCLOSURE

Technical Solution

This summary is provided to introduce a selection of concepts in a simplified format that is further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein describes methods of operating user equipment, the user equipment, and a serving base station thereof.

In accordance with some example embodiments of the inventive concepts, a method of operating a user equipment is disclosed. The method includes detecting a condition related to the user equipment (UE) while in one of a radio frequency (RF) inactive state and a cell handover, the condition indicating one of (a) the UE is not in reception of signaling information from a serving base station during the RF inactive state and (b) the UE is out of synchronization with the serving base station. The method includes determining an event related to one of transmission of data by the UE, reception of data by the UE, and radio resource management (RRM) measurement by the UE in conjunction with the detected condition. The method includes applying one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform radio resource management (RRM) measurement.

In accordance with some example embodiments of the inventive concepts, user equipment is disclosed. The user equipment includes at least one processor configured to detect a condition related to the user equipment (UE) while in one of a radio frequency (RF) inactive state and a cell handover, the condition indicating one of (a) the UE is not in reception of signaling information from a serving base station during the RF inactive state and (b) the UE is out of synchronization with the serving base station. The at least one processor is configured to execute computer readable instructions to determine an event related to one of transmission of data by the UE, reception of data by the UE, and radio resource management (RRM) measurement by the UE in conjunction with the detected condition. The at least one processor is configured to execute computer readable instructions to apply one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform radio resource management (RRM) measurement.

In accordance with some example embodiments of the inventive concepts, a method of operating user equipment by a serving base station is disclosed. The method includes detecting a condition related to the user equipment (UE) while in one of a radio frequency (RF) inactive state and a cell handover, the condition indicating one of (a) the UE is not in reception of one or more of signaling information and multi-carrier signaling information from the serving base station during the RF inactive state and (b) the UE is out of synchronization with the serving base station. The method includes configuring a RF cycle of the UE based on the one or more of signaling information and multi-carrier signaling information to enable the UE to receive the one or more of signaling information and multi-carrier signaling information, the RF cycle is a periodic repetition of the RF inactive state and a RF active state.

In accordance with some example embodiments of the inventive concepts, a serving base station operating a user equipment is disclosed. The serving base station includes at least one processor configured to detect a condition related to the user equipment (UE) while in one of a radio frequency (RF) inactive state and a cell handover, the condition indicating one of (a) the UE is not in reception of one or more of signaling information and multi-carrier signaling information from the serving base station during the RF inactive state and (b) the UE is out of synchronization with the serving base station. The at least one processor is configured to configure a RF cycle of the UE based on the one or more of signaling information and multi-carrier signaling information to enable the UE to receive the one or more of signaling information and multi-carrier signaling information, the RF cycle is a periodic repetition of the RF inactive state and a RF active state.

Some advantages of the present disclosure include, but not limited to, enabling the UE to intelligently operate such that UE is able to receive data and/or signaling information.

These aspects and advantages will be more clearly understood from the following detailed description taken in conjunction with the accompanying drawings and claims.

DESCRIPTION OF DRAWINGS

These and other features, aspects, and/or advantages of the present disclosure will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of some operations involved to help to improve understanding of aspects of the present disclosure. Furthermore, in terms of the construction of the device, one or more components of the device may have been represented in the drawings by conventional symbols, and the drawings may show some specific details that are pertinent to understanding some example embodiments of the inventive concepts so as not to obscure the drawings with details that will be readily apparent to those of ordinary skill in the art having benefit of the description herein.

MODE FOR INVENTION

For the purpose of promoting an understanding of the principles of the disclosure, reference will now be made to some example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting. Embodiments of the present disclosure will be described below in detail with reference to the accompanying drawings.

Figure 1:
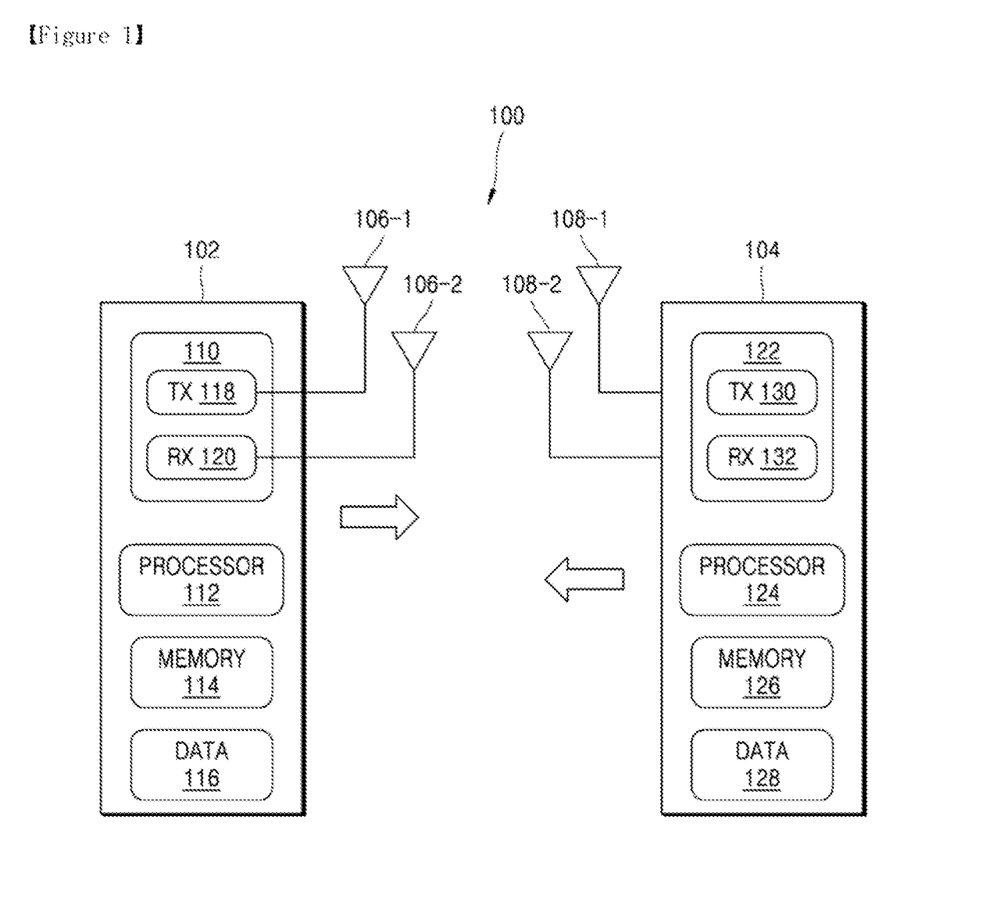
FIG. 1 illustrates a block diagram of network environment depicting interaction between user equipment and a base station for operating the user equipment, in accordance with some example embodiments of the inventive concepts.

FIG. 1 illustrates a block diagram of network environment 100 depicting interaction between user equipment 102 and a base station 104 in 5th Generation (5G) communication system in accordance with some example embodiments of the inventive concepts. The user equipment 102 (hereinafter referred to as the "UE 102") can be any electronic device used to communicate voice and/or data to the base station 104, which in turn may communicate with a network of devices (e.g., public switched telephone network (PSTN), the Internet, etc.). Examples of the UE 102 include but not limited to smartphones, laptops, notebooks, tablets, smartwatches, personal digital assistants (PDAs), etc. The UE 102 may be alternatively and/or interchangeably referred to as mobile station, wireless communication device, subscriber device, mobile terminal, mobile device, etc., as per 3rd Generation Partnership Project (3GPP). The base station 504 (hereinafter referred to as the "BS 104") can be any electronic device that provides access to a network (e.g., Local Area Network (LAN), the Internet, etc.) to the UE 102. The BS 104 may be alternatively and/or interchangeably referred to as Node B, gNode B (gNB), an evolved Node B (eNB), a home enhanced Node B (HeNB), etc., as per 3rd Generation Partnership Project (3GPP).

The UE 102 may communicate with the BS 104 using antenna(s) 106. The BS 104 may communicate with the UE 102 using antenna(s) 108-1 to 108-2. In an example, the UE 102 may transmit signals to the BS 104, also known as uplink transmission, through the antenna 106-1 and may receive signals from the BS 104, also known as downlink transmission, through the antenna 106-2. Similarly, the BS 104 may receive signals from the UE 102, also known as uplink transmission, through the antenna 108-1 and may transmit signals to the BS 104, also known as downlink transmission, through the antenna 108-2. The UE 102 and the BS 104 may communicate with each other through channels, represented by directional arrows. Uplink channels transmit data from the UE 102 to the BS 104 while the downlink channels transmit data from the BS 104 to the UE 102. Examples of the uplink channel include a PUCCH (Physical Uplink Control Channel) and a PUSCH (Physical Uplink Shared Channel), PRACH (Physical Random Access Channel), etc. For example, the PUSCH may be used for transmitting uplink data (i.e., Transport Block(s), MAC PDU, and/or UL-SCH (Uplink-Shared Channel)). Examples of downlink channels include a PUCCH, a PDSCH, etc. For example, the PUCCH may be used for transmitting Downlink Control Information (DCI). For the sake of brevity, only two antennas are illustrated. However, both the UE 102 and the BS 104 may include any number of antennas.

The UE 102 includes a RF transceiver(s) 110, a processor 112, a memory 114, and data 116. The transceiver(s) 110 may include a transmitter 118 and a receiver 120 for transmitting and receiving signals from the BS 104 through the antennas 106-1 to 106-2. The UE 102 may also include other components such as encoder, decoder, modulator, and demodulator for performing various operations on data being transmitted and received by the UE 102. In an example implementation, the UE 102 is able to support multiple or plurality of Subscriber Identity Modules (SIMs). In one implementation, the UE 102 is operating in Multi-SIM-Multi-Standby (MSMS) mode, for e.g., a UE with Dual-SIM-Dual-Standby (DSDS), and therefore contains single RF transceivers 110 supporting multiple radio access technologies and is shared among the SIMs. In another implementation, the UE 102 is operating in Multi-SIM-Multi-Active (MSMA) mode, for e.g., a UE with Dual-SIM-Dual-Active (DSDA), and therefore contains multiple RF transceivers 110 supporting multiple radio access technologies for the SIMs.

The transceiver 110, the processor 112, the memory 114, and the data 116 may be communicatively coupled with each other. The data 116 may serve, amongst other things, as a repository for storing data processed, received, and/or generated by the processor 112.

The processor 112 may be a single processing unit or a number of units, all of which could include multiple computing units. The processor 112 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 112 may be configured to fetch and/or execute computer-readable instructions and/or data (e.g., the data 116) stored in the memory 114.

The processor 112 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The RRC layer functionality is associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting. The PDCP layer functionality is related to header compression/decompression and security. The RLC layer and the MAC layer functionality is related to data transmissions, error correction, and channel prioritizations.

The memory 114 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The BS 104 includes a transceiver 122, a processor 124, a memory 126, and data 128. The transceiver 122 may include a transmitter 130 and a receiver 132 for transmitting and receiving signals from the BS 104 through the antennas 108-1 to 108-2. The BS 104 may also include other components such as encoder, decoder, modulator, and demodulator for performing various operations on data being transmitted and received by the BS 104.

The transceiver 122, the processor 124, the memory 126, and the data 128 may be communicatively coupled with each other. The data 128 may serve, amongst other things, as a repository for storing data processed, received, and/or generated by the processor 124.

The processor 124 may be a single processing unit or a number of units, all of which could include multiple computing units. The processor 124 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 124 may be configured to fetch and/or execute computer-readable instructions and/or data (e.g., the data 128) stored in the memory 126.

Similar to the processor 112, the processor 124 provides RRC layer functionality associated with system information (e.g., MIB, SIBs) acquisition, RRC connections, and measurement reporting; PDCP layer functionality associated with header compression/decompression, and security; RLC layer and the MAC layer functionality is related to data transmissions, error correction, and channel prioritizations.

The memory 126 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

Now, in 5G NR, UE 102 and the BS 504 support 5G frame structure, which provides a fixed overall structure for defining data block transmission timing. The 5G/NR frame structure may be FDD in which for a particular set of subcarriers (carrier system bandwidth), subframes within the set of subcarriers are dedicated for either downlink (DL) or uplink (UL), or maybe TDD in which for a particular set of subcarriers (carrier system bandwidth), subframes within the set of subcarriers are dedicated for both DL and UL. A frame (10 milliseconds (ms)) may be divided into 10 equally sized subframes (1 ms). Each subframe may include one or more time slots. Subframes may also include slots, which may include 7, 4, or 2 OFDM symbols. Slots and symbols are of flexible lengths and depend on subcarrier spacing. Each slot may include 7 or 14 symbols, depending on a slot format. The first four symbols, i.e., symbol 0 to symbol 3 are used for transmitting Synchronization Signal Block Signals (SSB) which includes Physical Broadcast Channel (PBCH), Primary Synchronization Signal (PSS), and Secondary Synchronization Signal (SSS). The remaining symbols are used for transmitting data. The slot format indicates whether the symbols are all UL, DL, or a mix of DL, UL, and flexible symbols. In a slot in a downlink frame, the UE 102 assumes that downlink transmissions only occur in 'downlink' or 'flexible' symbols. In a slot in an uplink frame, the UE 102 shall only transmit in 'uplink' or 'flexible' symbols. The UE 102 is configured with the slot format dynamically through DL control information (DCI) through a received slot format indicator (SFI) or semi-statically/statically through radio resource control (RRC) signaling. Also, the UE 102 measure Synchronization Signal Block Signal (SSB) and/or Channel State Information-Reference Symbols (CSI-RS) for mobility measurements from the configured slot format and frame structures received from the BS 104 and periodically transmits the measurements to the BS 104.

In an example implementation, the UE 102 is operating in MSMS mode. In an example implementation, the UE 102 uses Discontinuous Reception (DRX) in order to reduce power consumption during new radio (NR) network measurements. DRX cycle consists of "on periods" or "active period" during which the UE monitors downlink channels and physical signals (such as PDCCH) and "sleeping periods" when the UE can switch its receivers off. There are three RRC states defined for UE in 5G NR—RRC_IDLE, RRC_INACTIVE, and RRC_CONNECTED. DRX operation is controlled in the three RRC states by configuring various timers, i.e., DRX-ON DurationTimer, DRX Inactivity Timer, DRX Downlink Retransmission Timer, DRX Uplink Retransmission Timer, DRX LongCycle, and DRX ShortCycle.

Now, when a SIM(s) of the UE 102 in standby mode or the UE 102 is in RRC_INACTIVE state, the UE 102 is unable to receive the data. Also, the UE 102 cannot perform CSI-RS measurements in DRX mode (in both active and inactive time) in certain conditions, i.e., (1) when static configurations are not available from the network, (2) SFI signaling is not detectable/receivable during inactive time of DRX, and (3) UE may not have slot format for the candidate set of symbol of the slots configured by higher layer for CSI-RS.

Accordingly, in some embodiments of the invention, the UE 102 is enabled to apply one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform radio resource management (RRM) measurement.

Figure 2:
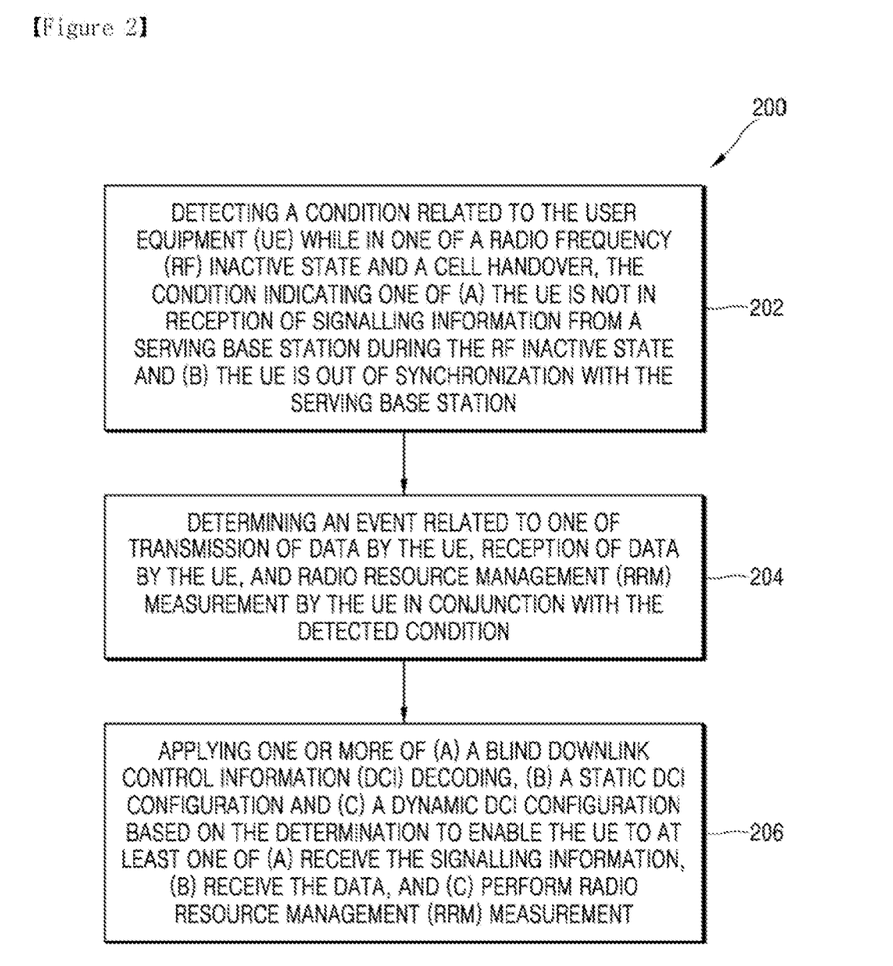
FIG. 2 to FIG. 3 illustrates flow charts of methods for operating the user equipment, in accordance with some example embodiments of the inventive concepts.

Reference is made to FIG. 2 that illustrates a flow chart of a method of applying the blind DCI decoding or static DCI configuration or dynamic DCI configuration. At step 202, the processor 112 detects a condition related to the UE 102 while in one of a radio frequency (RF) inactive state and a cell handover. In one example, the RF inactive state can indicate the UE 102 is in RRC_INACTIVE state or in DRX inactive state/period of a DRX cycle while operating in DRX mode as described earlier. In an example, the RF inactive state can indicate SIM(s) of the UE 102 are in standby mode while operating MSMS mode. In the standby mode, the RF transceiver is paused or black-out or tuned-away and is unable to receive or transmit data or signaling information. In an example, the RF inactive state can indicate the UE 102 has entered in an inactive mode when not receiving multimedia broadcast multicast service (MEMS) signals. In some example, the RF inactive state can indicate any high priority related scenarios. The cell handover indicates when the UE 102 moves from a serving cell or base station, for e.g., the BS 104 to another cell. The condition indicating one of (a) the UE 102 is not in reception of signaling information from the BS 104 during the RF inactive state and (b) the UE 102 is out of synchronization with the BS 104. The signaling information and corresponding characteristics of the signaling information is based on channel quality indicator, repetition factor, retransmission request, aggregation level, and signal strength of the UE 102. The characteristics of the signaling information include periodicity, transmission, and format. Examples of the signaling information include but not limited to SFI in DCI 2.0 and SSB. In an example, the processor 112 detects the UE 102 is out of synchronization with the BS 104 or is not in reception of signaling information when the RF transceiver is tuned-away while operating in MSMS mode. In an example, the processor 112 detects the UE 102 is out of synchronization with the BS 104 based on freshly or currently measured signal quality and previously measured signal quality. In case the currently measured signal quality deviates from a threshold value derived from the previously measured signal quality, the processor 112 determines the UE 102 is out of synchronization with the BS 104. In case the currently measured signal quality is within the threshold value derived from the previously measured signal quality, the processor 112 determines the UE 102 is in synchronization with the BS 104. The processor 112 may derive the threshold value using techniques or mechanism as known in the art.

At step 204, the processor 112 determines an event related to one of transmission of data by the UE 102, reception of data by the UE 102, and radio resource management (RRM) measurement by the UE 102 in conjunction with the detected condition. The RRM measurements are performed by the processor 112 for cell reselection or cell handover. In an example, the processor 112 may perform RRM measurement once for a single DRX cycle. In another example, the processor may perform RRM measurements once for multiple DRX cycles. Based on the RRM measurements for one cell, the UE 102 may reselect or perform handover to a second cell. In such examples, the processor 112 determines the event based on the DRX cycle. In an example, the processor 112 determines the event related to reception or transmission of data based on signaling information received prior to switching to the RF inactive slate.

At step 206, the processor 112 applies one or more of (a) a blind downlink control information (DCI) decoding, (b) a static DC1 configuration and (c) a dynamic DCI configuration based on the determination to enable the UE to at least one of (a) receive the signaling information, (b) receive the data, and (c) perform radio resource management (RRM) measurement.

Now, as described earlier, the UE 102 is configured with the slot format dynamically through DCI through a received SEI or semi-statically/statically through RRC signaling. As such, in one implementation, determines a reception of the signaling information prior to the UE 102 switching to the RF inactive state from a RF active state during a start offset. In one example, the RF active state can indicate the UE 102 is in RRC_CONNECTED state or in DRX active state/period of a DRX cycle while operating in DRX mode as described earlier. In an example, the RF active state can indicate SIM of the UE 102 are in active mode while operating MSMS mode. In the active mode, the RF transceiver is tuned-in and is able to receive or transmit data or signaling information. The start offset indicates start position of RF active period. In an example, the RF active period can indicate time when a SIM will be in "active" mode while the UE is operating in the MSMS mode. In such example, an RF inactive period can indicate time when a SIM will be in "inactive" mode while the UE is operating in the MSMS mode. In an example, the RF active period is the DRX "on period" or the "active period" while the UE is operating in the DRX mode. In such example, an RF inactive period is the DRX "off period" or the "inactive period" while the UE is operating in the DRX mode. In an example, the start offset may be configured by the BS 104. In an example, the start offset is configured by the processor 104 when the UE 102 is operating in MSMS mode.

The processor 112 applies a higher priority to the reception of signaling information prior to the UE 102 switching to the RF inactive state. As such, an RF cycle comprising of the RF active period and the RF inactive period are aligned to receive the signaling information. The processor 112 then receives the signaling information in the RF active state. In an example, the higher priority is assigned to the SFI signaling with respect to various operations/activities in the MSMS mode such as paging, switching, system information reception, measurements for cell search and cell retention, and data reception across protocol stacks. As such, the RF transceiver tuning is performed to receive the SFI signaling in respect of the various operations/activities in the MSMS mode. Such aligning minimizes the loss and/or enables possible recovery of signaling information during MSMS operations. In an example, the reception of SFI signaling is aligned with the MSMS scheduling operations based on periodicity and occurrence of the SFI signaling. As such, the processor 112 wakes up the UE 102 from inactive period to read or receive SFI signaling. In another example, the processor 112 prioritizes the reception of the SFI signaling in a first protocol stack over on-going or currently running activities or services in a second protocol stack to avoid missing of the SFI signaling.

In one implementation, upon detecting the RF inactive state, the processor 112 performs the RRM measurements (for e.g., RSSP, CSI-RS) based on signaling information received while the UE 102 is the RF active state prior to switching to the RF inactive state. In one example, the processor 112 applies or uses dynamic DCI configuration to obtain the previous signaling information received during the RF active. In one example, the processor 112 applies or uses static DCI configuration to obtain the default signaling information received during the RF active.

The processor 112 then validates the RRM measurements based on a threshold value and RRM measurements performed prior to the UE 102 switching to the RF inactive state. In an example, the threshold value can be derived from the previous RRM measurements using techniques as known in the art. In an example, the threshold value is broadcasted by the BS 104. During validation, the processor 112 rejects the RRM measurements when RRM measurement variation is outside the threshold value and waits for the signaling information. The processor 112 accepts the RRM measurements when RRM measurement variation is within the threshold value.

In one implementation, the processor 112 switches to the RF active state from the detected RF inactive state. During the RF active state, the processor 112 receives data from the BS 104. The processor 112 then validates the received data based on a detection of signaling information when the UE 102 switches to the RF active state. In one example implementation, the processor 112 sends a service request for the signaling information to the BS 104 upon detecting the UE is out of synchronization with the BS 104. The processor 112 detects the UE 102 is out of synchronization in a manner as described earlier. The processor 112 sends the service request using techniques as known in the art. The processor 112 may send the service request through active RF transceiver or through the RF transceiver receiving the data. Based on the received signaling information, the processor 112 validates the received data. In an example, the processor 112 initiates a Random Access Channel (RACH) procedure to send the service request for SFI signaling to the BS 104 to reconfigure the DL or UL slots or symbols. The processor 112 can initiate the RACH processor to correspond to the best SSB in default bandwidth par (BWP). In an example implementation, the processor 112 switches the UE 102 to RF active state early than the active period and detect signaling information or signal strength of a channel. The processor 112 considers a slot in the frame structure as DL or UL based on the signaling information or the signal strength and continues receiving of data if the processor 112 is able to detect the signaling information or the signal strength. The switching of the UE 102 to RF active state can he further based on blind DCI decoding, as explained below.

Figure 3:
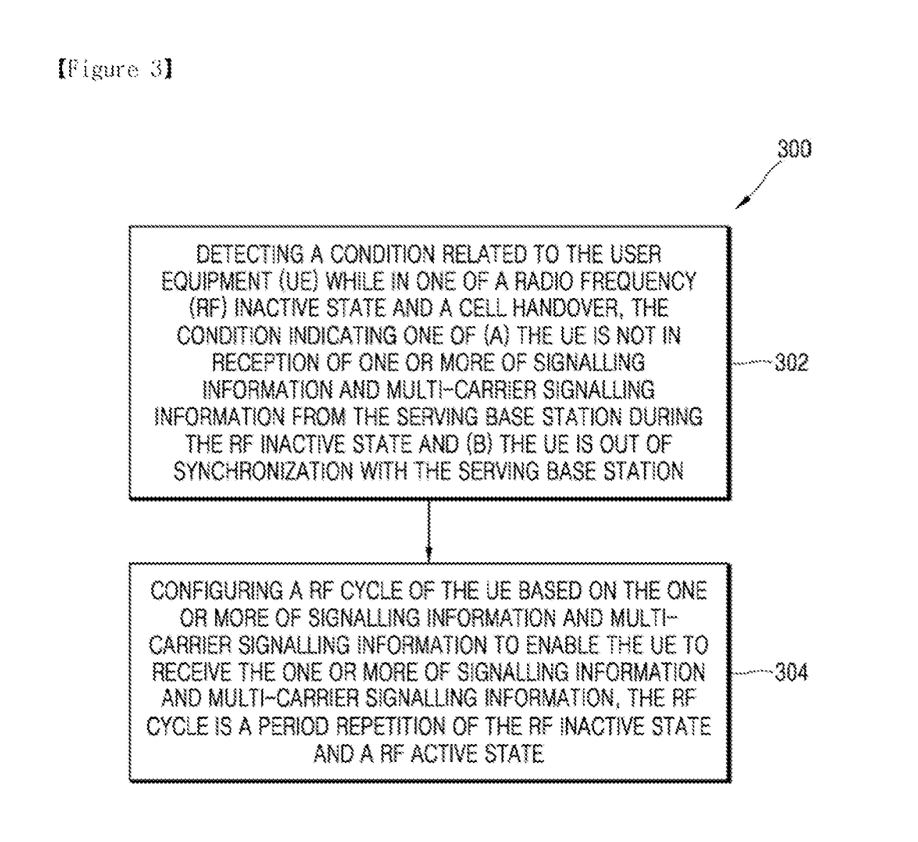

In another example implementation, the processor 112 applies blind DCI decoding to detect the signaling information. The processor 112 performs blind decoding to search sub-carrier spacing previously configured to determine the occurrences of DL slots or symbols. The processor 112 performs blind decoding using techniques as known in the art. In such example, the processor 112 detects DCI and interprets the downlink nature of the symbols of the slot where CS-IRS resources are configured by higher layer (e.g. DL DCI and/or UL DCI detection). In an example, the processor 112 determines the signaling information indicates the data is downlink data. The processor 112 then determines the received data is downlink data. Likewise, the processor 112 performs blind decoding to search sub-carrier spacing previously configured to determine the occurrences of UL slots or symbols In some embodiments of the invention, the BS 104 aligns RF cycle of the UE 102. As described earlier, the RF cycle comprises of the RF active period and the RF inactive period. Reference is made to FIG. 3 that illustrates a flow chart of a method of aligning the RF cycle. At step 302, the processor 124 detects a condition related to the UE 102 while in one of the RF inactive state and the cell handover. As described earlier, in one example, the RF inactive state can indicate the UE 102 is in DRX inactive state/period of the DRX cycle while operating in DRX mode as described earlier. In such example, the DRX cycle is configured by the processor 124 and transmitted to the UE 102. As such, the processor 124 detects the RF inactive state based on the DRX cycle. In another example, the RF inactive state can indicate SIM(s) of the UE 102 are in standby mode while operating MSMS mode. In the standby mode, the RF transceiver is paused or black-out or tuned-away periodically and is unable to receive or transmit data or signaling information. The processor 124 transmits tune-away period, timing synchronization, etc., related to the MSMS operations to the UE 102. As such, the processor 124 detects the RF inactive stale based on the tune-away period. The condition indicating one of (a) the UE 102 is not in reception of one or more of signaling information and multi-carrier signaling information from the BS 104 during the RF inactive state and (b) the UE 102 is out of synchronization with the BS 104. In an example, when the UE 102 is RRC_CONNECTED state, on the arrival of downlink data the BS 104 transmits a scheduling indication on the DLSCCH and transmits data on the DL-SCH. In such example, if the BS 104 does not receive HARQ feedback signals from the UE 102, the processor 124 determines the UE 102 is out of synchronization. In an implementation, the processor 124 determines the UE 102 is not in reception of one or more of signaling information and multi-carrier signaling information when the UE 102 does not provide IIARQ feedback signals. As would be understood, single-carrier signaling information is sent from the BS 104 to the UE 102 when the UE 102 is operating on a single downlink (DL) carrier and a single uplink (UL) carrier for communicating with the BS 104. Similarly, multi-carrier signaling information is sent from the BS 104 to the UE 102 when the UE 102 is operating on a multiple DL carriers and UL carriers for communicating with the BS 104. Signaling information to support data transmission on one DL carrier may be sent on the same DL carrier and/or an associated UL carrier. Similarly, signaling information to support data transmission on one UL carrier may be sent on the same UL carrier and/or an associated DL carrier.

At 304, the processor 124 configures the RF cycle of the UE 102 based on the one or more of signaling information and multi-carrier signaling information to enable the UE 102 to receive the one or more of signaling information and multi-carrier signaling information. As described earlier, the RF cycle is a periodic repetition of the RF inactive state and the RF active state. In an example, the UE 102 is operating in DRX mode and as such the RF cycle is same as the DRX cycle. To this end, the processor 124 configures a time period of the RF active state in the RF cycle based on a periodicity factor of the one or more of signaling information and multi-carrier signaling information. In an example, the time period of the RF active state is based on a physical downlink control channel (PDCCH) periodicity in the DCI. In an example, the processor 124 configures the DRX cycle to enable the RF transceiver of the UE 102 operating on single-carrier receive the signaling information. In an example, the processor 124 configures the DRX cycle to enable the RF transceiver of the UE 102 operating on multi-carriers receive the signaling information corresponding to all the multi-carriers. In an example, the UE 102 is operating in MSMS mode and as such the RF cycle is based on the tuned-away period and tuned-in period. As such, the processor 124 configures the tuned-in period based on the periodicity factor of the one or more of signaling information and multi-carrier signaling information.

Thereafter, the processor 124 transmits the one or more of signaling information and the multi-carrier signaling information during the RF active state of the UE 102. The signaling information and/or the multi-carrier signaling information include an indication that UL/DL synchronization is adjusted to the time period, for e.g., PDCCH Periodicity. Upon reception of the signaling information and/or the multi-carrier signaling information with the indication, the UE 102 readjusts the UL/DL timing.

Thus, in conventional systems, there is loss of signaling information or non-reception of data during periods of RF tuning-away when the UE is operating in MSMS mode. Similarly, there is loss of signaling information or non-reception of data during DRX inactive periods when the UE is operating in DRX mode. Any loss of signaling information leads to the UE having no knowledge about SSB and/or CSI-RS and the nature of slot format i.e., which the symbols are all UL, DL, or a mix of DL, UL, and flexible. This further leads to reduction in performance of services running in protocol stacks and performance of the UE. However, the present invention leads to minimize the loss and/or possible recovery of the signaling information. As such, in some embodiment, the RF cycle is aligned with the reception of the signaling information. In an example, reception of the signaling information is prioritized with respect to MSMS operation. In some example embodiment, the loss of signaling information is avoided and/or the signaling information is recovered by methods of re-application of previous signaling information (i.e., through dynamic configuration) or default signaling information (i.e., through static configuration) or blind decoding.

While specific language has been used to describe the present disclosure, any limitations arising on account thereto, are not intended. As would be apparent to a person in the art, various working modifications may be made to the method in order to implement the inventive concepts as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

The invention claimed is:

1. A method of operating a user equipment, the method comprising:
    detecting a condition related to the user equipment (UE) while in one of a radio frequency (RF) inactive state and a cell handover, the condition indicating one of (a) the UE is not in reception of signaling information from a serving base station during the RF inactive state and (b) the UE is out of synchronization with the serving base station;
    determining an event related to one of transmission of data by the UE, reception of data by the UE, and radio resource management (RRM) measurement by the UE in conjunction with the detected condition; and
    applying one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform the RRM measurement,
    determining a reception of the signaling information prior to the UE switching to the RF inactive state from a RF active state during a start offset, the start offset indicating start position of RF active period;
    applying a higher priority to the reception of signaling information based on a periodicity factor of the signaling information prior to the UE switching to the RF inactive slate; and
    enabling the UE to receive the signaling information in the RF active state.

2. The method as claimed in claim 1, comprising:
    enabling the UE to perform the RRM measurements based on the signaling information received while the UE is in the RF active state; and
    validating the RRM measurements based on a threshold value and the RRM measurements performed prior to the UE switching to the RF inactive state.

3. The method as claimed in claim 1, comprising:
    switching the UE to the RF active state;
    enabling the UE to receive the data while the UE is in the RF active state; and
    validating the received data based on a detection of a signaling information when the UE switches to the RF active state.

4. The method as claimed in claim 3, wherein the detection of the signaling information when the UE switches to the RF active state comprises at least one of:
    applying the blind DCI decoding to detect the signaling information;
    sending a service request to the serving base station upon detecting the UE is out of synchronization with the serving base station; and
    receiving the signaling information from the base station in response to the service request.

5. The method as claimed in claim 4, wherein the service request is sent by a RF transceiver and the signaling information is received by one of (a) the RF transceiver and (b) a further RF transceiver.

6. The method as claimed in claim 1, wherein the signaling information and corresponding characteristics of the signaling information is based on channel quality indicator, repetition factor, retransmission request, aggregation level, and signal strength of the UE, wherein the characteristics of the signaling information include periodicity, transmission, and format.

7. A user equipment comprising:
    at least one processor configured to execute computer readable instructions to:
    detect a condition related to the user equipment (UE) while in one of a radio frequency (RF) inactive state and a cell handover, the condition indicating one of (a) the UE is not in reception of signaling information from a serving base station during the RF inactive state and (b) the UE is out of synchronization with the serving base station;
    determine an event related to one of transmission of data by the UE, reception of data by the UE, and radio resource management (RRM) measurement by the UE in conjunction with the detected condition;
    apply one or more of (a) a blind downlink control information (DCI) decoding, (b) a static DCI configuration and (c) a dynamic DCI configuration based on the determination to enable the UE to at least one of (a) receive the signaling information, (b) receive the data, and (c) perform RRM measurement, and
    determine a reception of the signaling information prior to the UE switching to the RF inactive state from a RF active state during a start offset, the start offset indicating start position of RF active period;
    apply a higher priority to the reception of signaling information prior to the UE switching to the RF inactive state; and
    enable the UE to receive the signaling information in the RF active stale prior to switching to the RF inactive state.

8. The user equipment as claimed in claim 7, wherein the at least one processor configured to execute computer readable instructions to:
    enable the UE to perform the RRM measurements based on the signaling information received while the UE is in an RF active state prior to switching to the RF inactive state; and
    validate the RRM measurements based on a threshold value and the RRM measurements performed prior to the UE switching to the RF inactive state.

9. The user equipment as claimed in claim 7, wherein the at least one processor configured to execute computer readable instructions to:
    switch the UE to the RF active state;
    enable the UE to receive the data while the UE is in the RF active state; and
    validate the received data based on a detection of a signaling information when the UE switches to the RF active state.

10. The user equipment as claimed in claim 9, wherein the at least one processor configured to execute computer readable instructions to at least one of:
  apply the blind DCI decoding to detect the signaling information;
  send a service request to the serving base station upon detecting the UE is out of synchronization with the serving base station; and
  receive the signaling information from the base station in response to the service request.

11. The user equipment as claimed in claim 10, comprises one or more RF transceivers and wherein the service request is sent by a RF transceiver and the signaling information is received by one of (a) the RF transceiver and (b) a further RF transceiver.

12. The user equipment as claimed in claim 7, wherein the signaling information and corresponding characteristics of the signaling information is based on channel quality indicator, repetition factor, retransmission request, aggregation level, and signal strength of the UE, wherein the characteristics of the signaling information include periodicity, transmission, and format.

\* \* \* \* \*